(12) United States Patent
Hwang et al.

(10) Patent No.: US 7,050,680 B2
(45) Date of Patent: May 23, 2006

(54) OPTICAL COUPLING DEVICE HAVING SILICON OPTICAL BENCH AND OPTICAL FIBER WITH ANGLED END FACE

(75) Inventors: Sung-Hwan Hwang, Daejeon (KR); Yeon-Duck Ryu, Daejeon (KR); Sang-Hwan Lee, Daejeon (KR); Myeong-Hyun Kim, Cheongju-si (KR); Hyun-Jin Choi, Daejon (KR); Woo-Chang Choi, Daejeon (KR)

(73) Assignees: Fionix Inc., Daejeon (KR); Institute of Information Assessment, Daejeon (KR)

( * ) Notice: Subject to any disclaimer, the term of this patent is extended or adjusted under 35 U.S.C. 154(b) by 142 days.

(21) Appl. No.: 10/334,878

(22) Filed: Dec. 31, 2002

(65) Prior Publication Data

US 2004/0202428 A1    Oct. 14, 2004

(30) Foreign Application Priority Data

Aug. 30, 2002 (KR) .................. 10-2002-0052062

(51) Int. Cl.
*G02B 6/30* (2006.01)

(52) U.S. Cl. .......................................... 385/49; 385/88
(58) Field of Classification Search ................. 385/49, 385/88, 89

See application file for complete search history.

(56) References Cited

U.S. PATENT DOCUMENTS

| 6,027,255 | A | * | 2/2000 | Joo et al. ...................... 385/88 |
| 6,081,638 | A | * | 6/2000 | Zhou ............................ 385/31 |
| 6,132,107 | A | * | 10/2000 | Morikawa ..................... 385/89 |
| 6,491,447 | B1 | * | 12/2002 | Aihara ......................... 385/92 |
| 6,530,698 | B1 | * | 3/2003 | Kuhara et al. ................ 385/88 |
| 2003/0099273 | A1 | * | 5/2003 | Murry et al. ................ 372/108 |

FOREIGN PATENT DOCUMENTS

EP          893711 A2 *  1/1999

* cited by examiner

*Primary Examiner*—Juliana Kang
(74) *Attorney, Agent, or Firm*—Baker Botts LLP

(57) ABSTRACT

The present invention relates to an optical transmittance device including an optical fiber having a tilted incident plane and a silicon optical bench (SiOB) with a mirror plane. In accordance with the present invention, there provided an optical device, including: a substrate having a groove with a tilted surface, wherein the groove has a mirror plane on the tilted surface; a light emitting means aligned to the substrate; and an optical fiber including a tilted incident plane, wherein a reflected light from the mirror plane is incident to the tilted incident plane.

6 Claims, 3 Drawing Sheets

OPTICAL COUPLING DEVICE HAVING SILICON OPTICAL BENCH AND OPTICAL FIBER WITH ANGLED END FACE

BACKGROUND OF THE INVENTION

1. Field of the Invention

The present invention relates to an optical coupling device; and, more particularly, to an optical coupling device having a silicon optical bench (SiOB) and an optical fiber with an angled end face.

2. Description of Related Arts

As a high-speed Internet network is widely distributed and subscribers to this high-speed Internet network service rapidly increase, the amounts of data traffic also increase. Thus, a telecommunication system that uses electric signals confronts a limitation to meet the above demand. For this reason, an optical communication system is started to be the alternative of the conventional telecommunication system since it is able to transmit large amounts of data. Optical fibers, optical transmitter modules and optical receiver modules are representative optical components used in the optical communication system. For the optical transmitter and receiver modules high-speed, small size, low cost, and an ease of mass-production are key factors in the view of commercialization.

Since a typical optical module using a TO-can packaged optical device has problems in a high-speed operation and a large volume, an optical module using a silicon optical bench (hereinafter referred as to SiOB) technology has been currently developed and commercialized. Herein, the SiOB provide a function for an optical coupling of an optical fiber to a laser by including solder-bumps and a V-shaped groove. A laser chip is aligned and mounted on the SiOB. The V-shaped groove is the place in which an optical fiber is aligned and fixed, and the solder bumps are used for alignment and bonding of a laser chip.

Optical modules using the SiOB have advantages of reduced assembly costs because the optical fiber and the optical active elements such as a laser diode and a photo-diode can be aligned by a passive alignment technique such as a conventional flip-chip bonding technique. Also, the optical modules can be minimized due to the fact that plural of optical fiber and arrayed optical active elements can be integrated onto one substrate. FIG. 1 is a diagram showing an optical coupling device using an edge emitting laser and a SiOB structure in accordance with a prior art. (Refer to references G. C. Joo, S. H. Lee, K. S. Park, N. Hwang, J. S. Choi and M. K. Song, "Bidirectional optical coupling of transceiver chip for subscribers", Electron. Lett., vol. 34, no. 24, November 1998 and M. H. Choi, H. J. Koh, E. S. Yoon, K. C. Shin and K. C. Song, "Self-Aligning Silicon Groove Technology Platform for the Low Cost Optical Module", IEEE ECTC, pp. 1140–1144, 1999.)

With reference to FIG. 1, a groove 11 is formed on a surface of a SiOB 10. An optical fiber 16 is located on the groove 11. Also, on top of the SiOB 10, a core 17 of the optical fiber 16 is located at a height identical to a height at which an active area of an edge emitting laser 14 is formed. The edge emitting laser 14 is mounted on the SiOB 10 by a metal pad 12 and a solder 13. Typically, a monitoring photodiode 15 is allocated in an opposite to the optical fiber 16.

A light emitted from the edge emitting laser 14 is transmitted 18 through the core 17 of the optical fiber 16 and the monitoring photodiode 15 receives the rear emitted light 19 of the laser 14.

FIG. 2 is a diagram showing an optical coupling device with the use of a surface emitting laser and an optical fiber having an angled end face in accordance with a prior art (Refer to the U.S. Pat. No. 6,389,202 and the U.S. Pat. No. 6,315,464).

With reference to FIG. 2, one end face of an optical fiber 30 to which light is incident is formed as to have an angle of about 45° with respect to an optical fiber axis, and a mirror plane 32 coated with metal such as Au or Al is formed on the angled end face of the optical fiber 30. A vertical cavity surface emitting laser (VCSEL) 33 is allocated at a bottom portion of the angled end face of the optical fiber 30. In this case, a laser light emitted from the VCSEL 33, that is, an incident light IL incident to the optical fiber 30 is reflected at the mirror plane 32 and transmitted through the core 31 of the optical fiber 30. Herein, the light transmitted through the core 31 of the optical fiber 30 is called TL.

However, in the case of applying this optical coupling structure, a reflection light RL is inevitably generated as a portion of the incident light IL emitted from the VCSEL is reflected at end facean incident plane of an optical fiber 30. The reflected light is incident to the VCSEL again. As a result, the VCSEL 33 is degraded due to the reflection light RL.

SUMMARY OF THE INVENTION

It is, therefore, an object of the present invention to provide an optical coupling device capable of improving performance on an optical coupling between a surface emitting laser and an optical fiber by using a silicon optical bench (SiOB) that can easily carry out a passive alignment.

It is another object of the present invention to provide an optical coupling device capable of preventing degradation of the surface emitting laser due to a reflection light generated at an incident plane of an optical fiber.

In accordance with an aspect of the present invention, there is provide an optical coupling device, comprising: a substrate having a groove with a tilted surface, wherein the groove has a mirror plane on the tilted surface; a light emitting means aligned to the substrate; and an optical fiber including a tilted incident plane, wherein a reflected light from the mirror plane is incident to the tilted incident plane.

In accordance with another aspect of the present invention, there is provide an optical device, comprising: a substrate; a groove being formed within the substrate and having a tilted surface with an 'A' degree of a tilt angle at one side, wherein the groove has a mirror plane on the tilted surface; a light emitting means aligned to the substrate; and an optical fiber wherein the index of refraction of a core is $n_{core}$ and an incident plane that receives a reflection light from the mirror plane has a 'B' degree of a tilt angle, wherein the tilt angles 'A' and 'B' and the index of refraction of the core satisfy a specific condition that $\sin(2A-B)=n_{core}\times\sin B$.

The optical coupling device in accordance with the present invention includes a silicon optical bench (SiOB) having a mirror plane of which tilt angle is approximately 54.7°±1° and an optical fiber of which incident plane has a tilt angle. Especially, the mirror plane of the SiOB is fabricated by anisotropic etching of a (100) silicon wafer. As a result of this specific arrangement, it is possible to couple a surface emitting laser and an optical fiber with the SiOB. In the case that the incident plane of an optical fiber where an incident light arrives has an specific angle which respect to the mirror plane, it is also possible to minimize the incident light reflected towards a surface emitting laser, thereby preventing degradation of the surface emitting laser due to the reflection light. In the mean time, with a specific consideration of the index of refraction of the optical fiber which ranges from about 1.45 to about 1.50, the tilt angle of the incident plane is set to be in a range from about 56° to about 59° by arranging the center of light emitted from the surface emitting laser and reflected at the mirror plane to be parallel to a core of the optical fiber. As a result, it is possible to achieve the maximum efficiency on an optical coupling.

BRIEF DESCRIPTION OF THE DRAWING(S)

The above and other objects and features of the present invention will become apparent from the following description of the preferred embodiments given in conjunction with the accompanying drawings, in which.

DETAILED DESCRIPTION OF THE INVENTION

Figure 1:
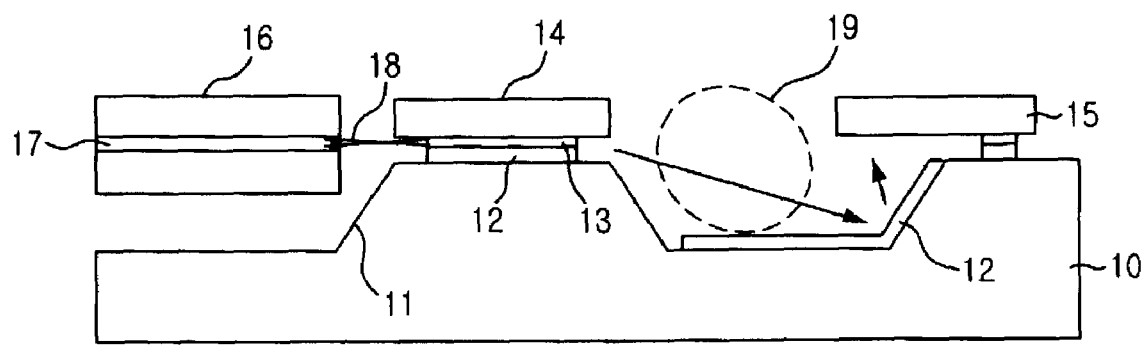
FIG. 1 is a cross-sectional view showing an optical coupling device using a silicon optical bench (SiOB) and an edge emitting laser according to a prior art.
Figure 2:
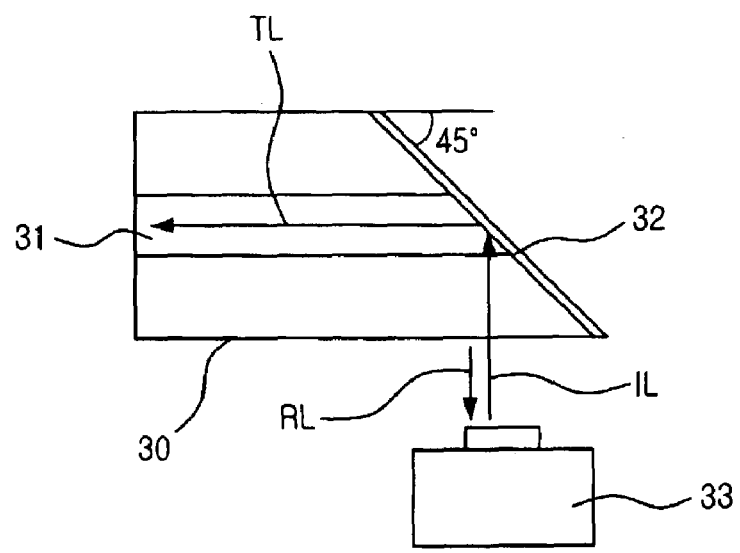
FIG. 2 is cross-sectional view showing an optical coupling device using an optical fiber having a 45 degree angled end face and a surface emitting laser end facein accordance with a prior art.
Figure 3:
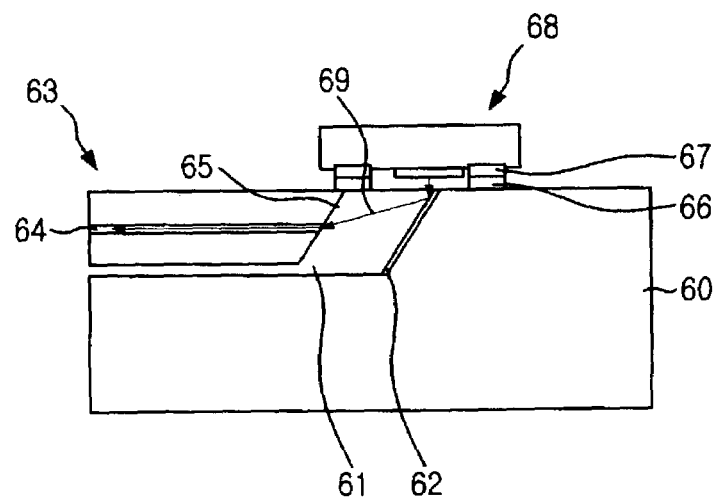
FIG. 3 is a cross-sectional view showing an optical coupling device in accordance with a preferred embodiment of the present invention.

FIG. 3 is a cross-sectional view showing an optical coupling device in accordance with a preferred embodiment of the present invention.

With reference to FIG. 3, the optical coupling device includes a silicon optical bench 60 (hereinafter referred as to SiOB) having a groove 61, a mirror plane 62 allocated on one side of the groove 61 and had approximately 54.74°±1° of a tilt angle, a vertical cavity surface emitting laser (hereinafter referred as to VCSEL) 68 aligned on top of the mirror plane 62, a metal pad 66 being stacked on the SiOB and supporting the VCSEL 68, a solder bump 67 and an optical fiber 63 aligned on the groove 61. In particular, an incident plane 65 of the optical fiber 63 is designed to have about 56° to about 59° of a tilt angle with respect to a core axis. Also, the mirror plane 62 is a metal layer formed by depositing Al or Au on one side of the groove 61.

Preferably, the metal pad 66 can be formed with the same metal layer such as Au with the mirror plane 62.

A light emitted from the VCSEL 68 is reflected at the mirror plane 62 of the SiOB 60 and directed into the core 64 of the optical fiber 63. A reference numeral 69 represents a propagation path of the light. The optical coupling device constructed as shown in FIG. 3 sets a tilt angle of an incident plane 65 of the optical fiber 63 through which the light is incident to the optical fiber 63 to have the maximum efficiency on an optical coupling. An optimum value of the tilt angle of the incident plane 65 should be determined in such that the light incident to the optical fiber 63 corresponds to the core axis (hereinafter referred as to CA) of the optical fiber 63 with considerations of the tilt angle of the mirror plane 62 and a typical index of refraction of the optical fiber 63. Assuming that the tilt angle of the mirror plane 62 is approximately 54.74±1°, and the typical index of refraction of the optical fiber 63 is in a range from about 1.45 to about 1.50, the optimum value of the tilt angle of the incident plane 65 ranges from about 56° to about 59°.

The following will briefly describe the SiOB.

The groove 61 of the SiOB 60 can be formed through which a silicon wafer having a crystal surface of 100 is anisotropically etched by Potassium hydroxide (KOH) or ethylenediamine pyrocatechol (EDP) solution. After completing the process, a method such as sawing is used to cut the silicon wafer. Then, one side of an end part of the V-groove 61 is opened to allow the optical fiber 63 to be freely inserted, while the other side of the end part is terminated at a proper location of the cutted wafer.

Generally, a single crystal of pure silicon is known as a material having a large difference in an etch ratio according to crystal plane when performing an etching process by using aqueous KOH or EDP solution. Particularly, a crystal surface of (100) and that of (111) have a large difference in the etch ratio. Thus, an etch pattern with an arbitrary shape is formed on a surface of the silicon wafer with the crystal surface of (100), and then, the etching process is proceeded to form a rectangular pattern of which four corners have the crystal surfaces of (111). Accordingly, the other side of the V-groove 61 shown in FIG. 3 is has the crystal surface of (111). Crystallographically, the crystal surface of (111) is set to have an angle of approximately 54.74° (54.74°±1° with consideration of error) with a main surface of the silicon wafer having the crystal surface of (100).

Meanwhile, the VCSEL 68 is mounted on the SiOB through a flip chip bonding and constructed in a typical array form. Hence, it is preferable to realize a multi-mode device by forming the optical fibers 63 and the V-grooves 61 as the same number of the VCSEL 68.

Figure 4:
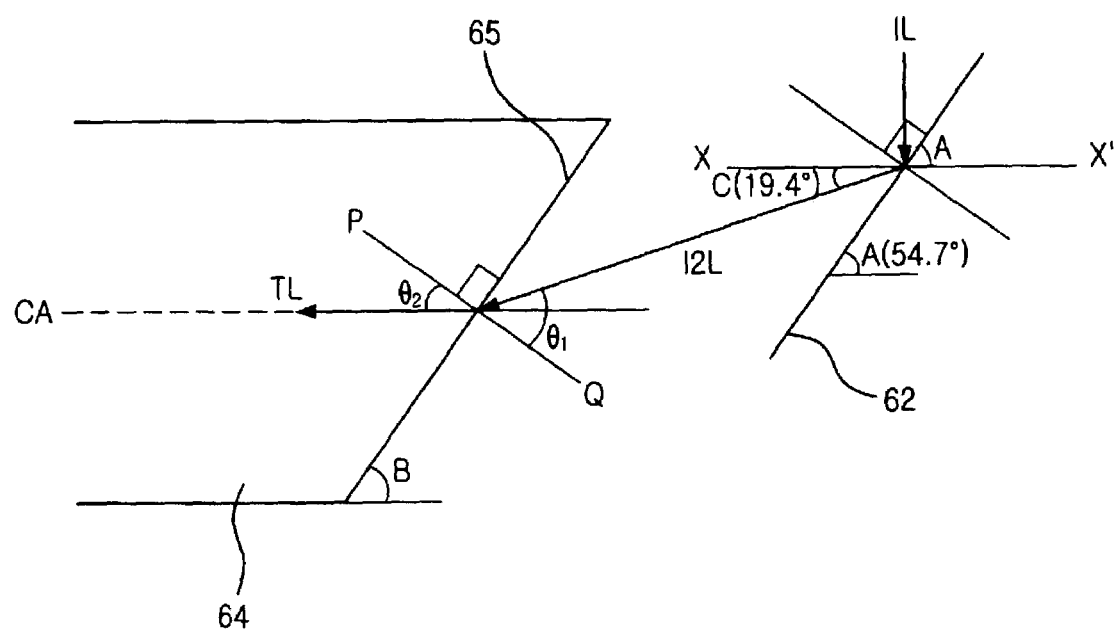
FIG. 4 is a diagram for describing procedures for calculating a tilt angle of an incident plane in an optical fiber.

FIG. 4 is a diagram for describing procedures for calculating a tilt angle of an incident plane in an optical fiber.

Referring to FIG. 4, the tilt angle 'A' of the mirror plane 62 is assumed to be approximately 54.7°. When a light IL emitted from a laser is incident perpendicularly to the mirror plane 62 of the SiOB, the incident light IL has an angle of about 35.3° (=90°−54.7°) with the mirror plane 62. Therefore, a laser light I2L reflected at the mirror plane 62 also has an angle of about 35.3° with the mirror plane 62. As a result, the reflected laser light I2L has an angle of about 19.4° (=54.7°−35.3°) with respect to a main surface of the SiOB.

Generally, an optical fiber includes a core at its center and a cladding layer encompasses the core of the optical fiber. The core of the optical fiber has the index of refraction slightly different from the index of the refraction of the cladding layer. Thus, a light passing through an inner part of the core is not transmitted through the cladding layer but solely transmitted through the core according to an total internal reflection procedure. Meanwhile, in case that a light incident from a cross-sectional surface of the optical fiber to the core enters with a certain incident angle with respect to the CA, the incident light is refracted at an interface between the one end part of the optical fiber and air in accordance with the Snell's law. If the refraction angle is greater than a specific angle, which is typically called critical angle, with respect to the CA of the optical fiber, the refracted light cannot be reflected to the inner part of the core at the interface between the core and the cladding layer.

Referring to FIG. 4, the above-mentioned angle will be generalized and further explanations will be accompanied in the following.

Assuming that the symbol 'A' is an tilt angle of the mirror plane 62 with respect to the main surface of the SiOB and the symbol 'C' is an angle of the laser light I2L reflected at the mirror plane 62 with respect to the main surface of the SiOB, i.e., an incident angle of the laser light I2L with respect to the CA of the optical fiber, it is possible to establish a relationship of C=2A−90.

That is, the laser light I2L is incident with an angle departing as much as the angle of C with respect to the CA. For this reason, if the incident plane 65 is cut perpendicularly to the CA, most of the laser light I2L will be lost and a partial portion of the laser light I2L will enter to the inner part of the core 64. The present invention uses an optical fiber 63 manipulated to have the incident plane 65 of which one side has an appropriate tilt angle. Hereinafter, the following will describe procedures for calculating an optimum tilt angle of the incident plane with use of several mathematic equations.

In the mean time, assuming that the incident plane 65 of the optical fiber 63 has the tilt angle 'B' with respect to the CA of the optical fiber 63 and drawing a normal line P-Q perpendicular to the incident plane 65 of the optical fiber 63, the laser light I2L reflected at the mirror plane 62 of the optical fiber 63 and the laser light TL refracted as passing through the incident plane 65 of the optical fiber 63 are assumed to have an angle θ1 and an angle θ2 with respect to the normal line P-Q, respectively. Then, both θ1 and θ2 have the following relationship as expressed below.

$$\theta1=90-B+19.4$$

$$\theta2=90-B \qquad \text{Eq. 1}$$

Herein, the index of refraction in accordance with Snell's law is applied to establish a further mathematic relationship between the θ1 and the θ2.

$$n_{air}\times\sin\theta1=n_{core}\times\sin\theta_2 \qquad \text{Eq. 2}$$

Herein, the $n_{air}$ is the index of refraction of air while $n_{core}$ is the index of refraction of the optical fiber. The above relationship of "C=2A−90" and the mathematic equations 1 and 2 are used to formulate the following mathematic equation 3, which shows a generalized relationship between the tilt angle 'A' of the mirror plane 62 and the tilt angle 'B' with respect to the CA of the incident plane 65 of the optical fiber 63.

$$\text{Sin}(2A-B)=n_{core}\times\sin(90-B)$$

Therefore, if it is assumed that the index of refraction of the optical fiber 63 changes within a range from about 1.45 to about 1.50 and the tilt angle of the tilted surface of the groove that appears due to anisotropic etching based on a surface crystal direction 100 of a silicon wafer changes within 54.7°±1° including errors, it is possible to set the laser light TL to enter the CA of the optical fiber 63 in case of setting the incident plane 65 of the optical fiber 63 to have an angle ranging from about 56° to about 59°. This fact further means that it is possible to maximize the efficiency of optical coupling between the laser device and the optical fiber.

Figure 5:
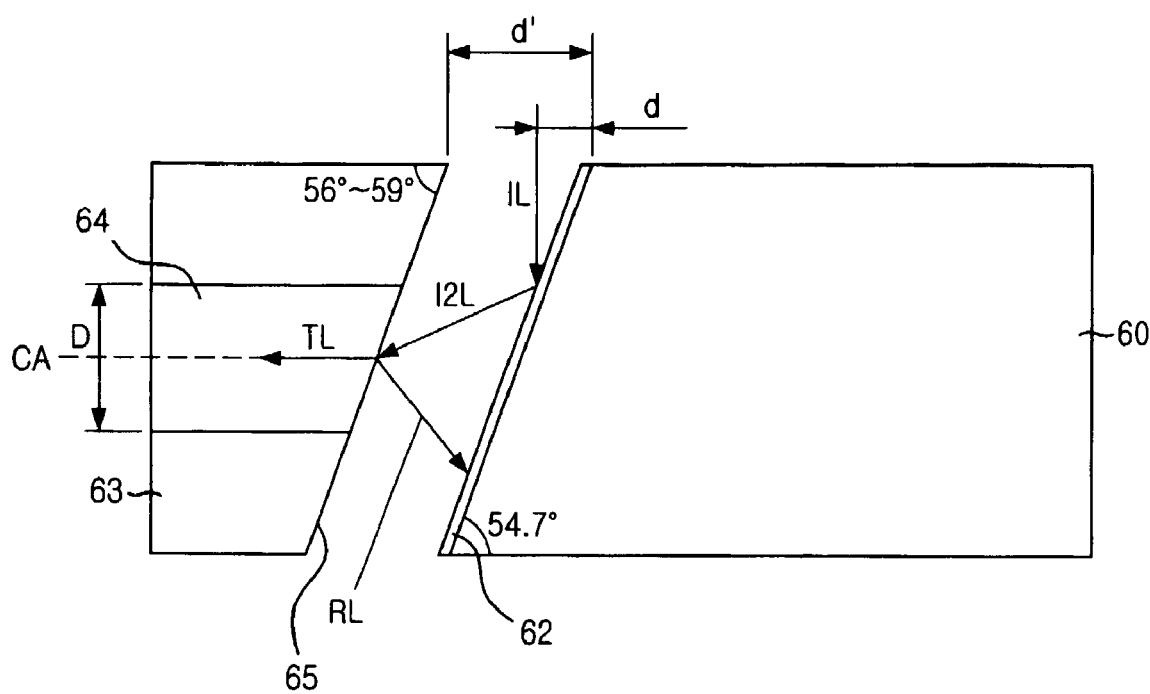
FIG. 5 is a diagram showing propagation path of transmitted and reflected lights in an optical coupling device in accordance with the present invention.

FIG. 5 is a diagram showing propagation paths of transmission and reflection lights in an optical coupling device in accordance with the present invention.

With reference to FIG. 5, the mirror plane 62 of the SiOB 60 and the incident plane 65 of the optical fiber 63 are formed to have approximately 54.7° of the tilt angle and approximately 56° to 59° of the tilt angle with respect to the CA of the optical fiber 63, respectively.

A light IL emitted from the VCSEL (not shown) is reflected at the mirror plane 62 of the SiOB 60 and incident to the optical fiber 63 as to be transmitted eventually. Although there occurs a reflected light RL at the incident plane 65 of the optical fiber 63, the reflected light RL is reflected to an opposite direction of the VCSEL since the incident plane 65 is formed to have a tilted surface. Hence, there hardly occurs reflection directed to the VCSEL. Accordingly, it is possible to prevent the degradation of laser light due to the reflection light RL through the use of the optical fiber 63.

Meanwhile, in FIG. 5, a simulation on the optical coupling is performed with assumptions that the tilt angle 'A' of the mirror plane 62 of the SiOB 60 is within a range of about 54.7°±1° and the tilt angle 'B' of the incident plane 65 of the optical fiber 63 with respect to the CA is in a range from about 56° to about 59°. Also, the simulation is performed by setting a diameter D of the core 64 of the optical fiber 63, a distance d between a point where the VCSEL emits a light and an upper edge of the mirror plane 62 and a distance d' between an upper edge of the incident plane 65 of the optical fiber 63 and the upper edge of the mirror plane 62 of the SiOB 60 to be 50 μm in a multi-mode, 25 μm and 35 μm, respectively. From this simulation, it is possible to attain approximately 60% of the optical coupling efficiency when the divergence angle of the light from the VCSEL is 30° and 90% of the optical coupling efficiency when the divergence angle of the laser light from the VCSEL is approximately 20°.

Although the preferred embodiment of the present invention describes a case of using the VCSEL as the laser device, the present invention is still applicable for another type of laser device emitting perpendicularly a light from the top of the SiOB, e.g., a light emitting diode (LED). Also, the preferred embodiment of the present invention provides a case that the tilt angle of the incident plane of the optical fiber is set in a range from about 56° to about 59° in connection with the assumption that the tilt angle of the mirror plane of the SiOB is approximately 54.74°±1°. However, the tilt angle of the incident plane of the optical fiber can be changed in accordance with a change of the tilt angle of the mirror plane of the SiOB or that of the index of refraction of the optical fiber. Furthermore, the preferred embodiment describes a single channel laser and single fiber. However, a multi-channel laser and multi-channel fiber are still applicable. Additionally, instead of using the optical fiber as embodied in the present invention, it is possible to apply the present invention to other types of optical waveguide.

While the present invention has been described with respect to certain preferred embodiments, it will be apparent to those skilled in the art that various changes and modifications may be made without departing from the scope of the invention as defined in the following claims.

What is claimed is:

1. An optical device, comprising:
    a substrate;
    a groove being formed within the substrate and having a tilted surface with an 'A' degree of a tilt angle at one side, wherein the groove has a mirror plane on the tilted surface;
    a light emitting means aligned to the substrate; and
    an optical fiber wherein the index of refraction of a core is $n_{core}$ and an incident plane that receives a reflection light from the mirror plane has a 'B' degree of a tilt angle,
    wherein the tilt angles 'A' and 'B' and the index of refraction of the core satisfy a specific condition that $\sin(2A-B)=n_{core}\times\sin B$.

2. The optical device as recited in claim 1, the substrate is a silicon optical bench.

3. The optical device as recited in claim 1, wherein the light emitting means is a light emitting diode (LED) or a vertical cavity surface emitting laser (VCSEL).

4. The optical device as recited in claim 1, further comprising a metal layer coated on the mirror plane.

5. The optical coupling device as recited in claim 1, wherein the 'A' degree of the tilt angle is in the range of approximately within 54.74°±1°.

6. The optical coupling device as recited claim 1, wherein the 'B' degree of the tilt angle ranges from about 56° to about 59°.

* * * * *